United States Patent

Hamada et al.

[11] Patent Number: 5,219,038
[45] Date of Patent: Jun. 15, 1993

[54] POWER TRANSMISSION DEVICE FOR A FOUR-WHEEL DRIVE VEHICLE

[75] Inventors: Tetsuro Hamada; Kazunori Shibuya; Kentaro Arai, all of Saitama, Japan

[73] Assignee: Honda Giken Kogyo Kabushiki Kaisha, Tokyo, Japan

[21] Appl. No.: 612,766

[22] Filed: Nov. 14, 1990

[30] Foreign Application Priority Data

Nov. 15, 1989 [JP] Japan .................. 1-296639
Sep. 7, 1990 [JP] Japan .................. 2-238245

[51] Int. Cl.⁵ .......................................... B60K 17/344
[52] U.S. Cl. .......................................... 180/248; 180/197; 364/424.1
[58] Field of Search .............. 180/248, 249, 247, 233, 180/197, 242, 243; 364/424.1, 426.03

[56] References Cited

U.S. PATENT DOCUMENTS

| | | | |
|---|---|---|---|
| 4,676,336 | 6/1987 | Hiramatsu et al. | 180/248 |
| 4,860,208 | 8/1989 | Bantle | 180/248 |
| 4,867,262 | 9/1989 | Takada et al. | 180/249 |
| 5,002,147 | 3/1991 | Tezuka et al. | 180/248 |
| 5,005,662 | 4/1991 | Kodama | 180/249 |
| 5,056,640 | 10/1991 | Yamamoto | 180/248 |
| 5,074,825 | 12/1991 | Hamasaki et al. | 180/248 |
| 5,080,187 | 1/1992 | Asano et al. | 180/248 |

FOREIGN PATENT DOCUMENTS 63-49526 3/1988 Japan .

*Primary Examiner*—Margaret A. Focarino
*Assistant Examiner*—Kevin Hurley
*Attorney, Agent, or Firm*—Lyon & Lyon

[57] ABSTRACT

A power transmission system for a four-wheel drive vehicle, comprising an engine for directly driving a primary driven axle, and a torque transmission device for transmitting drive torque from the primary driven axle to a secondary driven axle as required, according to a difference in the rotational speed between the front and rear axles, and the torque transmitted between the front and rear axles is reduced for a given difference in the rotational speed between the front and rear axles as a vehicle speed is increased. Thereby, the unnecessary burden of load on the rear axle members is reduced. Preferably, the torque transmission device comprises a structure for limiting the upper limit of the torque which can be transmitted to the secondary driven axle.

11 Claims, 3 Drawing Sheets

5,219,038

POWER TRANSMISSION DEVICE FOR A FOUR-WHEEL DRIVE VEHICLE

TECHNICAL FIELD

The present invention relates to a power transmission system for a four-wheel drive vehicle in which one of the front and rear wheel sets is driven by the engine at all time, and the other wheel set may be driven by the common engine as required.

BACKGROUND OF THE INVENTION

As a type of power transmission device to be interposed between the front wheels and the rear wheels of a four-wheel drive vehicle, it is known to directly connect one of the front and rear wheel sets with the engine, and to transmit a drive torque from this axle (primary axle) to the other axle (secondary axle) via a viscous fluid coupling which responds to a relative rotational speed therebetween. Such a viscous fluid coupling is provided with the property to vary the transmission torque depending on the difference in the rotational speed between the primary axle and the secondary axle, and the primary and secondary axles are substantially coupled with each other when the difference in the rotational speed between the primary and secondary axles has exceeded a certain limit. In regard to this point, the mechanical strengths of the primary and secondary axle members against torque are required to be substantially equal to each other. On the other hand, when the difference in the rotational speed between the primary and secondary axles is extremely small, the transmission torque to the secondary axle is substantially equal to zero, and the burden of load on the secondary axle in such a case is extremely light. In view of such a recognition, it has been proposed in Japanese patent laid-open publication No. 63-49526 to reduce the load on the secondary driven axle members by defining an upper limit of torque transmission to the secondary driven axle, and to thereby reduce the overall weight of the drive system. In the following disclosure, the words "axle member" is intended to mean not only the shafts for front or rear wheels but also all the members situated in the path of torque transmission from the primary driven axle to the secondary driven axle.

It sometimes occurs that a vehicle has to run for an extended period of time using front and rear wheels having different diameters for instance when an emergency spare tire is used or when anti-slip devices such as chains are applied to the wheels in case of snow. In such a case, a difference in rotational speed between the front and rear wheels is continually present, and the secondary axle may receive a drive torque that is larger than actually required even when no torque transmission is required between the primary and secondary axles. In other words, even though only the transmission of torque between the front and rear axles is required to be considered as a transient process under normal running condition, a drive torque may be continually transmitted to the secondary axle when the diameters of the tires are not identical. This is not desirable because the clutch would be placed under a high load condition over an extended period of time, and/or the slipping of the tires may be induced.

It is generally known that a metallic member may rupture or break even when the stress applied thereto is less than its rupture stress if it is repeatedly applied to the member, and metal fatigue is thereby induced. In particular, when a vehicle is running at high speed, the number of the repeated applications of stress for a given time period increases accordingly, and the effective limit stress of the power transmission members may be lowered because of the possibility of metal fatigue. Therefore, in order for the vehicle to withstand the continual running of the vehicle equipped with tires having uneven diameters, the safety factor in the design process has to be increased. Therefore, simply defining the upper limit of torque transmission to the secondary axle alone, as was the case with the aforementioned prior art, is not sufficient to achieve the reduction in weight in practical sense.

BRIEF SUMMARY OF THE INVENTION

In view of such problems of the prior art, a primary object of the preset invention is to provide a power transmission system for a four-wheel drive vehicle which is improved so as to prevent any unnecessary torque load from being continually applied to the secondary axle members which may induce metal fatigue.

A second object of the present invention is to provide a power transmission system for a four-wheel drive vehicle which is simple in structure but free from the drawbacks of conventional simple four-wheel drive systems.

According to the present invention, these and other objects can be accomplished by providing a power transmission system for a four-wheel drive vehicle, comprising: a first member which rotates in synchronism with front wheels; a second member which rotates in synchronism with rear wheels; a power source for directly driving one of the first and second members; and torque transmission means interposed between the first and second members for transmitting torque from one of the members directly driven by the power source to the other of the members at least under a certain condition; the torque transmitted between the members by the torque transmission means for a given difference between the rotational speeds of the front wheels and rear wheels being reduced as a vehicle speed is increased.

According to this structure, the capacity for torque transmission diminishes as the vehicle speed increases. Therefore, a sufficient torque transmission from the primary driven wheels to the secondary driven wheels is achieved in start-off (low speed condition) of the vehicle when the primary driven wheels are prone to slipping, and the effective level of torque transmission is diminished in high speed condition when the primary driven wheels are not prone to slipping. Therefore, it becomes possible to control the transmission of torque to the secondary driven wheels due to the continual operation of the vehicle using front and rear wheels having different diameters (in particular when the diameter of the primary wheels is smaller), for instance because one of the wheels consists of a smaller emergency spare tire.

Such a structure can be obtained if a difference between the rotational speeds of the front wheels and rear wheels required for the torque transmission means to transmit a given magnitude of torque is increased as a vehicle speed is increased.

Preferably, the torque transmission means is provided with means to restrict the upper limit of the level of torque transmission between the front and rear axles so that the requirements of mechanical strength of the secondary driven axle members may be reduced. Thereby, the requirements of the mechanical strength of the secondary driven axle members can be positively controlled.

According to a preferred embodiment of the present invention the torque transmission means comprises a first fluid pressure pump powered by the front wheels, a second fluid pressure pump powered by the rear wheels, a hydraulic clutch interposed between the front and rear wheels, a communication passage connected between an output end of the first fluid pressure pump and an input end of the second fluid pressure pump, and a branch passage connected between the communication passage and a hydraulic actuation chamber of the clutch.

The required properties of the torque transmission means can be achieved when a speed ratio of the first fluid pressure pump to the front wheels is smaller than a speed ratio of the second fluid pressure pump to the rear wheels, and/or when an output of the first fluid pressure pump for a given number of revolution of the front wheels is smaller than an output of the second fluid pressure pump for the number of revolution of the rear wheels.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
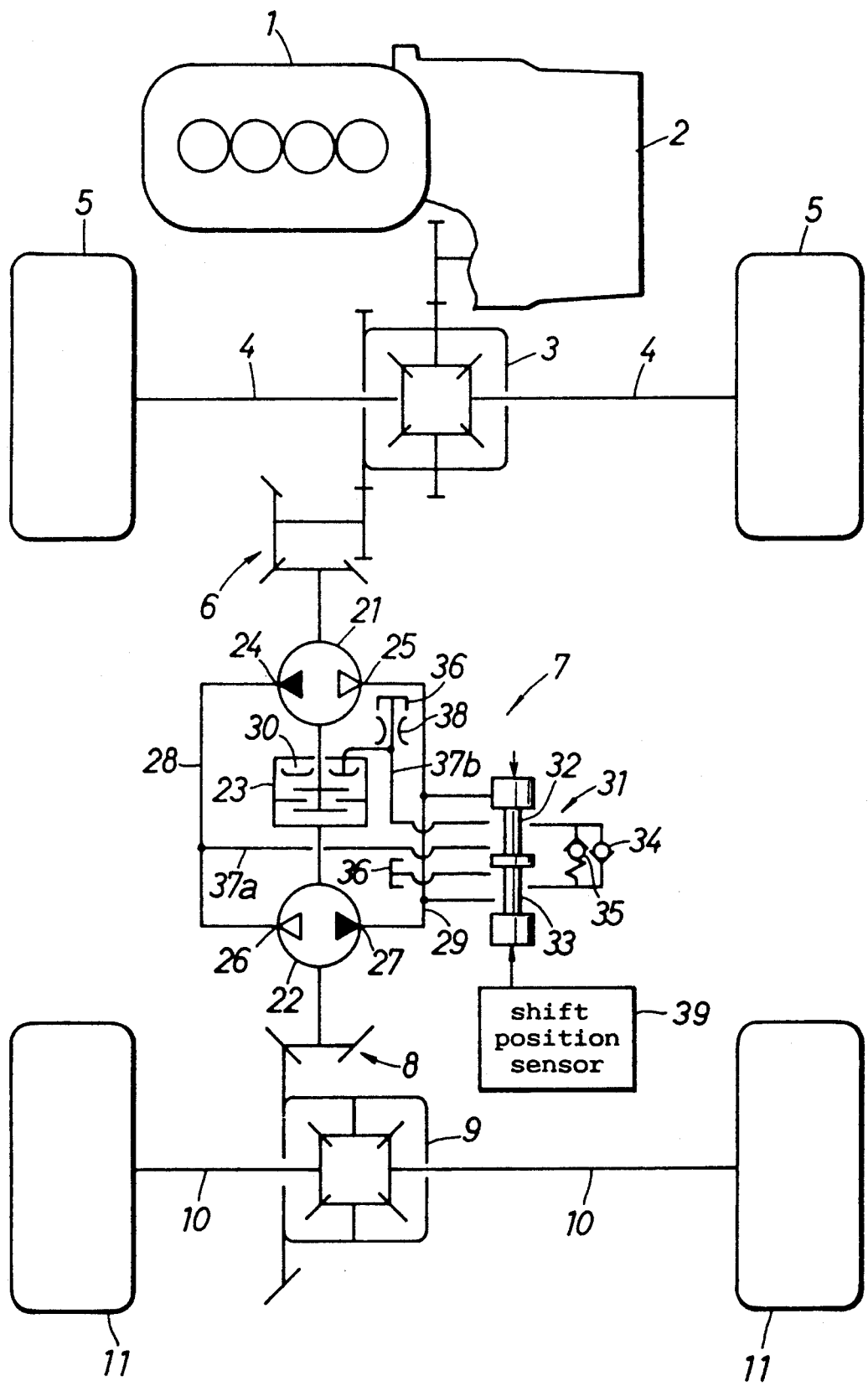
FIG. 1 is a skeleton diagram showing the overall structure of the power transmission system of the four-wheel drive vehicle according to the present invention.

FIG. 1 is a skeleton diagram of the power transmission system of a four-wheel drive vehicle to which the present invention is applied. The output of the engine 1 is supplied to a differential device 3 for the front wheels via a transmission device 2. The output of the differential device 3 is supplied to the right and left front wheels 5 via drive shafts 4.

The output of the engine 1 supplied to the differential device 3 is supplied to a power transmission device 7 which is described hereinafter via a bevel gear device 6, and the output of this power transmission device 7 is transmitted to a differential device 9 for the rear wheels via a bevel gear device 8. The output of the differential device 9 is supplied to the right and left rear wheels 11 via drive shafts 10.

The power transmission device 7 comprises a first fluid pressure pump 21 drivingly connected to the output shaft of the bevel gear device 6 for the front wheels, a second fluid pressure pump 22 drivingly connected to the input shaft of the bevel gear device 8 for the rear wheels, a fluid pressure actuated clutch 23 interposed between the output shaft of the bevel gear device 6 and the input shaft of the bevel gear device 8, and a fluid pressure control circuit (which is described hereinafter) for controlling the flow of oil related to the first and second oil pressure pumps 21 and 22 and the clutch 23.

The gear ratios of the front and rear bevel gear devices 6 and 8 differ from each other in such a manner that the following relationship holds between the rotational speeds of the fluid pressure pumps and the rotational speeds of the wheels:

$$\frac{\text{rotational speed of the first pump}}{\text{rotational speed of the front wheels}} < \frac{\text{rotational speed of the second pump}}{\text{rotational speed of the rear wheels}}$$

Figure 3:
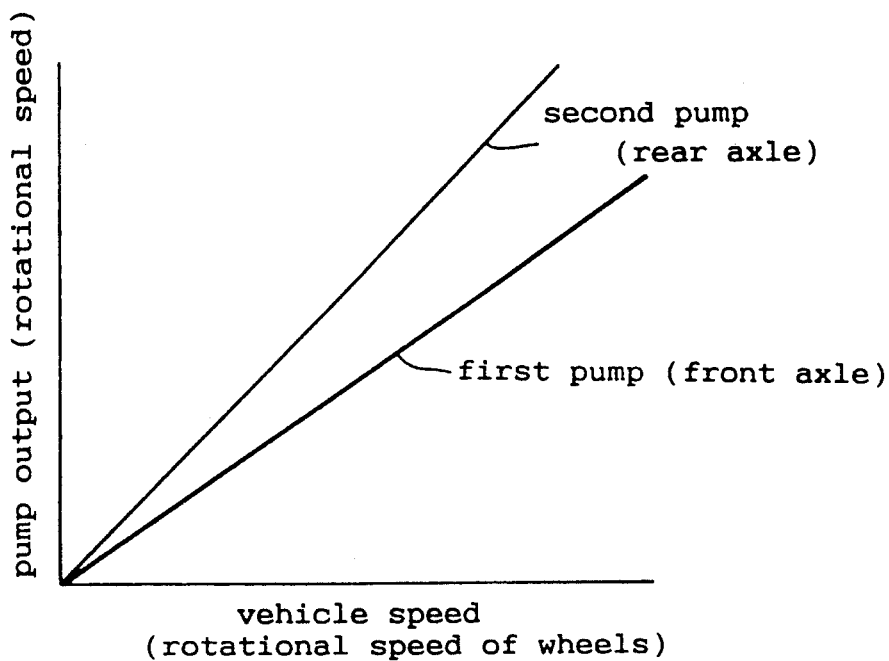
FIGS. 3 and 4 are graphs showing the properties of the system of the present invention.

In other words, the rate of increase of the rotational speed of the second fluid pressure pump 22 for a given increase in the rotational speed of the rear wheels is greater than that of the first fluid pressure pump 21 for the same increase in the rotational speed of the front wheels. It means that, as shown in FIG. 3, the rotational speed of the second fluid pressure pump 22 is higher when the rotational speeds of the front and rear wheels 5 and 11 are identical, and that the difference in the rotational speed between the first and second fluid pressure pumps 21 and 22 increases in proportion to the rotational speed of the wheels.

The first fluid pressure pump 21 consists of a gear pump or a vane pump which is provided with a first port 24 serving as an outlet port when the vehicle is moving forward and as an inlet port when the vehicle is moving rearward, and a second port 25 serving as an inlet port when the vehicle is moving forward and as an outlet port when the vehicle is moving rearward. The second fluid pressure pump 22 likewise consists of a gear pump or a vane pump which is provided with a third port 26 serving as an inlet port when the vehicle is moving forward and as an outlet port when the vehicle is moving rearward, and a fourth port 27 serving as an outlet port when the vehicle is moving forward and as an inlet port when the vehicle is moving rearward. These ports 24 through 27 are mutually connected in such a manner that the first port 24 and the third port 26 are connected to each other via a first communication oil passage 28 while the second port 25 and the fourth port 27 are connected to each other via a second communication oil passage 29.

The first and second fluid pressure pumps 21 and 22 have mutually different chamber capacities, and the output of the first fluid pressure pump 21 for each revolution is less than that of the second fluid pressure pump 22. It means that the change rate of the output for a given change in the rotational speed of the corresponding wheels is greater for the second fluid pressure pump 22 and the difference in the output of the first and second fluid pressure pumps 21 and 22 increases in proportion to the rotational speeds of the wheels if the speed ratio of the pump shafts are identical to the speed ratio of the front and rear axles 4 and 10 and the effective diameters of the front and rear wheels 5 and 11 are identical (refer to FIG. 3).

Figure 2:
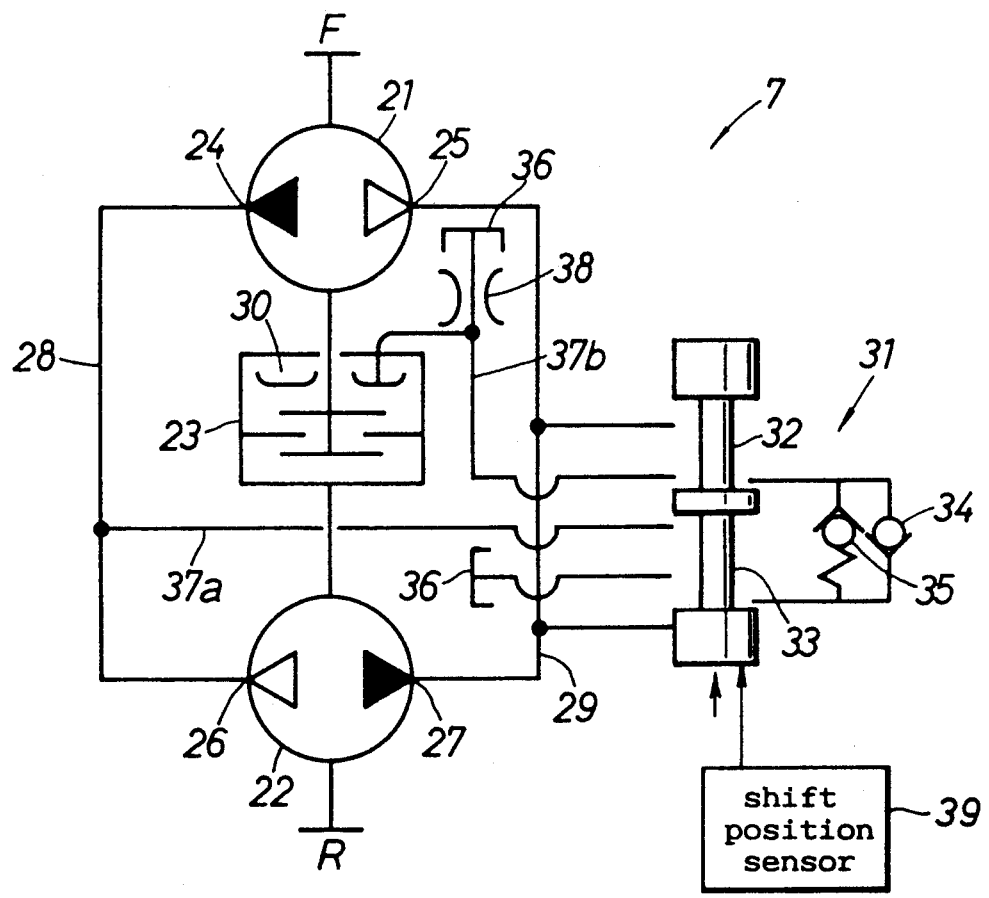
FIG. 2 is a hydraulic circuit diagram in the reverse condition.

The first and second communication oil passages 28 and 29 are connected to an actuation oil pressure chamber 30 of the fluid pressure actuation clutch 23 via a switching valve 31. This switching valve 31 consists of a spool valve which is switched over by a shift position sensor 39 depending on whether the transmission device 2 is in a forward range or a reverse range, and comprises a pair of valve chambers 32 and 33, a one-way valve 34 restricting the flow of oil from the first valve chamber 32 to the second valve chamber 33, and a relief valve 35 which communicates the first valve chamber 32 with the second valve chamber 33 to allow the flow of oil from the first valve chamber 32 to the second valve chamber 33 when the difference in pressure between the first valve chamber 32 and the second valve chamber 33 has reached a prescribed value. In the forward range, by activation of this switching valve 31, as shown in FIG. 1, the second communication oil passage 29 is communicated with the oil tank 36 via the second valve chamber 33, and the first communication oil passage 28 is communicated with the actuation oil pressure chamber 30 of the clutch via a by-pass oil passage 37a, the first valve chamber 32 and an actuation oil pressure supply passage 37b. Further, when the pressure of the actuation oil pressure chamber 30 of the clutch has increased beyond a certain level, it is released to the oil tank 36 via the relief valve 35. In the reverse range, as shown in FIG. 2, the first communication oil passage 28 is communicated with the oil tank 36 via the second valve chamber 33, and the second communication oil passage 29 is communicated with the actuation oil pressure chamber 30 of the clutch via the first valve chamber 32. Further, when the pressure acting upon the actuation oil pressure chamber 30 of the clutch is increased beyond a certain level, it is released to the oil tank 36 via the relief valve 35.

Further, a clutch actuation oil pressure supply passage 37b connecting the first valve chamber 32 with the actuation oil pressure chamber 30 of the clutch is communicated with a part of the oil tank 36 above its oil level, via a branch oil passage having an orifice 38.

Now the mode of operation of the above-described embodiment is described in the following for each of its different states.

When the vehicle accelerates upon start-off in the forward direction, the front wheels 5 may slip and rotate while the rear wheels 11 remain stationary. In such a case, since the first fluid pressure pump 21 alone rotates with the front wheels, the oil which has been supplied from the oil tank 36 to the second port 25 via the second valve chamber 33 and the second communication oil passage 29 is expelled from the first port 24 to the first communication oil passage 28, and all of it flows into the by-pass oil passage 37a so that an oil pressure may be applied to the clutch actuation oil pressure chamber 30 via the first valve chamber 32 and the clutch actuation oil pressure supply passage 37b. As a result, the clutch 23 is engaged, and the front wheels 5 are coupled with the rear wheels 11.

The oil pressure immediately upstream of the orifice 38 changes in proportion to the square of the difference in the output of the first pressure pump 21 and the input of the second fluid pressure pump 22. Further, depending on the rate of the oil passing through the orifice 38, it is possible to set the basic oil pressure property of the upstream end of the orifice. Since the transmission torque of the clutch 23 changes in proportion to the oil pressure acting upon the actuation oil pressure chamber 30, by appropriately selecting the relief pressure of the relief valve 35, it is possible to appropriately set the upper limit of the transmission torque of the clutch 23 (refer to FIG. 4).

When the clutch 23 is engaged and the drive torque is transmitted to the rear wheels, the output of the first fluid pressure pump 21 is received by the second fluid pressure pump 22 according to the increase in the rotational speed of the rear wheels. Further, the oil pressure acting upon the clutch actuation oil pressure chamber 30, or the force of engagement of the clutch 23 automatically changes according to the difference between the output of the first fluid pressure pump 21 and the input of the second fluid pressure pump 22, and, once the output of the first fluid pressure pump 21 and the input of the second fluid pressure pump 22 balance out with each other, no oil pressure acts upon the actuation fluid pressure supply passage 37b, and the clutch 23 is disengaged.

Since the point of balance between the output of the first fluid pressure pump 21 which is driven by the front wheels 5 directly driven by the engine 1, and the input of the second fluid pressure pump 22 which is driven by the rear wheels 11 receiving a drive force via the power transmission device 7 is determined by the operating properties of the fluid pressure pumps 21 and 22 illustrated in FIG. 3, it is achieved when the rotational speed of the front wheels 5 is higher than that of the rear wheels 11. The difference in the rotational speed between the front and rear wheels 5 and 11 at this point increases with the increase in the vehicle speed. These properties mean that the magnitude of the transmission torque by the clutch for a given difference in the rotational speed between the front and rear wheels 5 and 11 diminishes with the increase in the vehicle speed. It also means that the torque transmission capacity of the clutch 23 or the capability to restrict the difference in the rotational speed diminishes as the vehicle speed increases (refer to FIG. 4).

When the vehicle is gradually accelerating or decelerating, or cruising at constant speed in forward or rearward direction, the front and rear wheels 5 and 11 rotate at the same speed provided that the front and rear wheels 5 and 11 have an identical diameter. In the same way as in the case of forward movement of the vehicle, the output of the first fluid pressure pump 21 is always less than the input of the second fluid pressure pump 22, and the output of the second fluid pressure pump 22 is always higher than the input of the first fluid pressure pump 21. Hence, the output from the first port 24 is received by the third port 26, and a part of the output from the fourth port 27 returns to the third port 26 second via the first communication oil passage 27, by-pass oil passage 37a, the second valve chamber 33, the one-way valve 34, the first valve chamber 32 and the second communication oil passage 28. As a result, the pressure in the first communication oil passage 28 does not reach the actuation pressure of the clutch 23 and, therefore, the drive torque is not transmitted to the rear wheels 11.

When only the front wheels have stepped into a road surface having a low coefficient of friction during a cruising condition of the vehicle or when the vehicle is suddenly accelerated, the front wheels may temporarily get into a slipping condition. In such a case, the rotational speed of the front wheels becomes higher than that of the rear wheels 11, and the output from the first port 24 exceeds the input of the third port 26. As a result, the output from the first fluid pressure pump 24 cannot be accommodated by the input to the second fluid pressure pump 22, and the oil pressure corresponding to this difference between the output and input of the two fluid pressure pumps 21 and 22 is applied to the first communication oil passage 28. This oil pressure is conducted into the clutch actuation oil pressure chamber 30 via the by-pass oil passage 37a, the first valve chamber 32 and the actuation oil pressure supply passage 37b. Thereby, the clutch 23 is engaged, and a drive torque is transmitted to the rear wheels 11. The force of engagement of the clutch 23 changes automatically in relation with the difference in the rotational speeds of the front and rear wheels in the same way as in the above mentioned case, and the drive torque transmitted to the rear wheels 11 changes in proportion to the magnitude of the force of engagement of the clutch 23. In this case, the level of torque transmission for a given difference in the rotational speeds between the front and rear wheels diminishes as the vehicle speed increases.

When a braking force acts upon the wheels, since the balance of the braking force is generally more favored for the front wheels than the rear wheels, the front wheels 5 tend to be locked up before the rear wheels do in case of an excessive braking action. Since the engine brake following a cruise condition acts only upon the front wheels 5, the rotational speed of the front wheels 5 becomes temporarily lower than that of the rear wheels 11. When the rotational speed of the front wheels 5 is lower than that of the rear wheels 11, since the output of the first fluid pressure pump 21 becomes less than the input to the second fluid pressure pump 22, there is no output pressure in the actuation oil pressure supply passage 37b, and the clutch 23 would not be engaged. Therefore, the coupling between the front and rear wheels is interrupted. At this point, a part of the output from the fourth port 27 returns to the third port 26 via the second communication oil passage 29, the second valve chamber 33, the one-way valve 34, the first valve chamber 32, the by-pass oil passage 37a and the first communication oil passage 28.

When the front wheels have been completely locked up, the first fluid pressure pump 21 comes to a stop, and the second fluid pressure pump 22 alone rotates. As a result, all of the output of oil from the fourth port 27 to the second communication oil passage 29 returns to the third port 26 via the second valve chamber 33, the one-way valve 34, the first valve chamber 32, the by-pass oil passage 37a and the first communication oil passage 28. Therefore, in this case also, the clutch 23 is not engaged, and the coupling between the front and rear wheels is interrupted.

When the vehicle is moving rearward, the rotational directions of the first and second fluid pressure pumps 21 and 22 are reversed, and the relationship between the outlet ports and the inlet ports is reversed, but the basic principle is otherwise identical to the case when the vehicle is moving forward.

When the vehicle accelerates as it starts off in rearward direction, temporarily, the first fluid pressure pump 21 alone rotates. Then, as illustrated in FIG. 2, the oil, introduced into the first port 24 from the oil tank 36 via the second valve chamber 33, the by-pass oil passage 37a, and the first communication oil passage 28, is expelled from the second port 25 to the second communication oil passage 29, and, then, acts upon the clutch actuation oil pressure chamber 30 via the first valve chamber 32 and the actuation oil pressure supply passage 37b. As a result, the clutch 23 is engaged, and a drive torque is transmitted to the rear wheels 11.

In a similar manner as in the case of the vehicle moving forward, as the rotational speed of the rear wheels increases, a part of the output of the first fluid pressure pump 21 is received by the second fluid pressure pump 22, and the oil pressure acting upon the clutch actuation oil pressure chamber 30 changes according to the difference in the output and input of the two pumps 21 and 22 so that the ratio of torque distribution to the rear wheels changes accordingly. Once the output and input of the two fluid pressure pumps 21 and 22 has reached a balance, no oil pressure acts upon the clutch actuation oil pressure chamber 30, and the coupling between the front and rear wheels is interrupted.

When the vehicle is either gradually accelerating or gradually decelerating, or cruising at constant speed in reverse gear, in the same way as in the forward gear, the output of the first fluid pressure pump 21 is always less than the input of the second fluid pressure pump 22, and the output of the second fluid pressure pump 22 is always higher than the input of the first fluid pressure pump 21. Therefore, the output from the second port 25 is received by the fourth port 27, and a part of the output from the third port 26 returns to the fourth port 27 via the first communication oil passage 28, the by-pass oil passage 37a, the second valve chamber 33, the one-way valve 34, the first valve chamber 32 and the second communication oil passage 29. Therefore, the pressure in the second communication oil passage 29 does not reach the actuation level of the clutch 23, and no drive torque is therefore transmitted to the rear wheels 11.

When the front wheels 5 start slipping due to sudden acceleration from a constant speed rearward movement, the rotational speed of the front wheels 5 becomes higher than that of the rear wheels 11, and the output of the first fluid pressure pump 21 therefore exceeds the input of the second fluid pressure pump 22. Since the second fluid pressure pump 22 cannot accommodate the output from the first fluid pressure pump 21, the oil pressure corresponding to the difference in the output and input of the first and second fluid pressure pumps 21 and 22 acts upon the second communication oil passage 29. This oil pressure is conducted to the clutch actuation oil pressure chamber 30 via the first valve chamber 32 and the actuation oil pressure supply passage 37b. This causes the clutch 23 to be engaged, and a drive torque is transmitted to the rear wheels 11.

When the vehicle is moving rearward and a braking action takes place, since the rotational speed of the first fluid pressure pump 21 falls below that of the second fluid pressure pump 22, in the same way as in the case of applying a braking action when the vehicle is moving forward, there is no output to the actuation oil pressure supply passage 37b, and the clutch 23 is not engaged. Therefore, the coupling between the front and rear wheels is interrupted. At this point, a part of the output from the second fluid pressure pump 22 returns to the fourth port 27 via the first communication oil passage 28, the by-pass oil passage 37a, the second valve chamber 33, the one-way valve 34, the first valve chamber 32 and the second communication oil passage 29. Once the front wheels 5 are completely locked up, all of the output from the third port 26 returns to the fourth port 27 via the first communication oil passage 28, the by-pass passage 37a, the second valve chamber 33, the one-way valve 34, the first valve chamber 32 and the second communication oil passage 29. Therefore, in this case also, the coupling between the front and rear wheels is interrupted.

Now the operation of this embodiment when the effective diameters of the front and rear wheels differ from each other is described in the following.

Supposes that the effective diameter of the front wheels 5 which are directly driven by the engine is smaller than that of the rear wheels which are driven by way of the power transmission device 7. In this case, even when both the front and rear wheels 5 and 11 have reached a constant speed cruise condition involving no slipping or locking of the wheels, the rotational speed of the front wheels 5 is always higher than that of the rear wheels. Since the difference in the effective diameters of the front and rear wheels is a constant, the difference between the rotational speeds of the front and rear wheels 5 and 11 increases in proportion to the vehicle speed. Thereby, the force of engagement of the clutch 23 increases with the difference in the output of the first fluid pressure pump 21 and the input of the second fluid pressure pump 22, but, once the difference in the output and input increases to such an extent that the oil pressure acting on the actuation fluid pressure pump 30 exceeds a prescribed value, the relief valve 35 opens, and the transmission of excessive torque to the rear wheels 11 is avoided.

Since the gear ratios of the front and rear bevel gear devices 6 and 8 differ from each other, and the output capacity of the first fluid pressure pump 21 is smaller than that of the second fluid pressure pump 22 as mentioned previously, even when the difference between the rotational speeds of the front and rear wheels 5 and 11 due to their differences in their effective diameters has increased, it would not lead to the unnecessary increase of torque transmission to the rear wheels.

Thus, as long as the output of the first fluid pressure pump 21 in constant speed cruise condition is kept lower than that of the second fluid pressure pump 22, unnecessary transmission of torque to the rear wheels can be avoided.

If the effective diameter of the rear wheels 11 which are secondary drive wheels is smaller, their rotational speed is higher. This is substantially equivalent to the case where the front wheels are subjected to a braking action, and the coupling between the front and rear wheels 5 and 11 is therefore disconnected. Therefore, the transmission of torque to the rear wheels does not occur so that the difference in the effective diameters of the front and rear wheels would not cause any problems.

Figure 4:
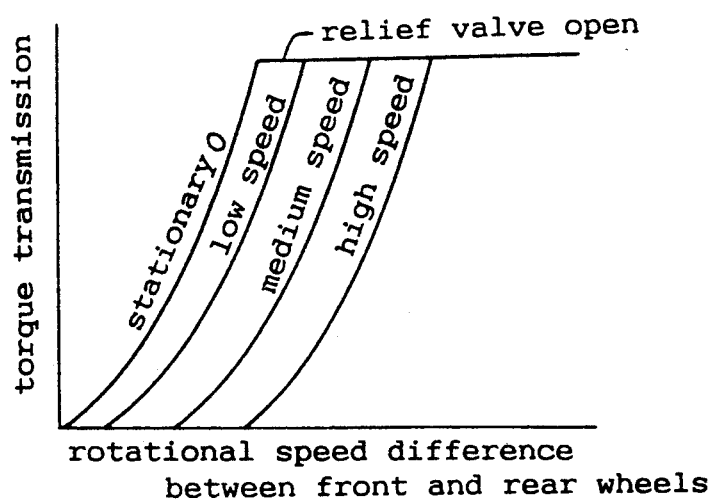

As described above, according to the structure of the present invention, the output capacity of the first fluid pressure pump 21 which is driven by the engine 1 along with the front wheels is smaller than that of the second fluid pressure pump 22 which is driven by the engine 1 by way of the clutch 23. Therefore, the oil pressure of the clutch 23 (torque transmission) is reduced to zero before the rotational speeds of the front and rear wheels 5 and 11 become equal to each other provided that the front and rear wheels 5 and 11 have a same effective diameter. This amounts to that the setting of the restriction on the difference between the rotational speeds of the front and rear wheels 5 and 11 is somewhat low, but, in practice, since the difference in the rotational speed between the front and rear wheels that is required to produce a given torque transmission level becomes less as the vehicle speed is reduced as shown in FIG. 4, a sufficient drive torque is transmitted to the rear wheels for a given difference in the rotational speed between the front and rear wheels in low speed range where the need for torque transmission to the rear wheels frequent occurs, typically in starting off the vehicle.

As the means for reducing the transmission torque of the clutch with the increase in the vehicle speed, it is possible to vary the chamber volumes of the first and second fluid pressure pumps 21 and 22 and to vary the speed ratios of the fluid pressure pumps to those of the corresponding wheels, either in combination as is the case with the present embodiment or separately.

Thus, according to the present invention, since unnecessary torque transmission to the secondary driven wheels can be avoided even when the effective diameters of the front and rear wheels are different from each other, it is possible to reduce the mechanical strength of various parts situated in the path for transmitting drive torque to the secondary driven wheels against metal fatigue. Therefore, a significant advantage can be obtained in reducing the weight of the secondary driven axle members. Furthermore, since a sufficient drive torque is transmitted to the rear wheels depending on the difference between the rotational speeds of the front and rear wheels, the vehicle can maintain all the practical advantages of the four-wheel drive vehicle.

Although the present invention has been described in terms of specific embodiments, it is possible to modify and alter details thereof without departing from the spirit of the present invention.

What we claim:

1. A power transmission system for a four-wheel drive vehicle, comprising:
   a first member which rotates in synchronism with front wheels;
   a second member which rotates in synchronism with rear wheels;
   a power source for directly driving said first member; and
   torque transmission means interposed between said first and second members for transmitting torque from said first member to said second member at least when a rotational speed of said front wheels is higher than that of said rear wheels by a prescribed value;
   said torque transmission means comprising a first fluid pressure pump powered by said front wheels, a second fluid pressure pump powered by said rear wheels, a hydraulic clutch interposed between said front and rear wheels, a communication passage connected between an output end of said first fluid pressure pump and an input end of said second fluid pressure pump, and a branch passage connected between said communication passage and a hydraulic actuation chamber of said clutch;
   said torque transmitted between said members by said torque transmission means for a given difference between the rotational speeds of said front wheels and rear wheels being reduced as a vehicle speed is increased.

2. A power transmission system according to claim 1, wherein said prescribed value increases in proportion to an increase in a vehicle speed.

3. A power transmission system according to claim 1, wherein a speed ratio of said first fluid pressure pump to said front wheels is smaller than a speed ratio of said second fluid pressure pump to said rear wheels.

4. A power transmission system according to claim 1, wherein an output of said first fluid pressure pump for a given number of revolution of said front wheels is smaller than an output of said second fluid pressure pump for said number of revolution of said rear wheels.

5. A power transmission system according to claim 1, further comprising means for limiting a maximum value of torque which may be transmitted by said torque transmission means.

6. A power transmission system according to claim 1, further comprising a relief valve connected between said branch passage and a pressure sink to restrict the level of fluid pressure in said actuation fluid pressure chamber of said clutch within a prescribed level.

7. A power transmission system for a four-wheel drive vehicle, comprising:
- a first member which rotates in synchronism with front wheels;
- a second member which rotates in synchronism with rear wheels;
- a power source for directly driving one of said first and second members; and
- torque transmission means interposed between said first and second members for transmitting torque from said first member to said second member at least when a rotational speed of said front wheels is higher than that of said rear wheels by a prescribed value;
- said torque transmission means comprising a first fluid pressure pump powered by said front wheels, a second fluid pressure pump powered by said rear wheels, a hydraulic clutch interposed between said front and rear wheels, a communication passage connected between an output end of said first fluid pressure pump and an input end of said second fluid pressure pump, and a branch passage connected between said communication passage and a hydraulic actuation chamber of said clutch;
- a difference between the rotational speeds of said front wheels and rear wheels required for said torque transmission means to transmit a given magnitude of torque being increased as a vehicle speed is increased.

8. A power transmission system according to claim 7, wherein a speed ratio of said first fluid pressure pump to said front wheels is smaller than a speed ratio of said second fluid pressure pump to said rear wheels.

9. A power transmission system according to claim 7, wherein an output of said first fluid pressure pump for a given number of revolution of said front wheels is smaller than an output of said second fluid pressure pump for said number of revolution of said rear wheels.

10. A power transmission system according to claim 7, further comprising means for limiting a maximum value of torque which may be transmitted by said torque transmission means.

11. A power transmission system according to claim 7, further comprising a relief valve connected between said branch passage and a pressure sink to restrict the level of fluid pressure in said actuation fluid pressure chamber of said clutch within a prescribed level.

* * * * *